United States Patent [19]

Stark et al.

[11] 4,444,490
[45] Apr. 24, 1984

[54] DATA STORAGE SYSTEM FOR STORING DOCUMENTS AND THE LIKE

[75] Inventors: Gary Stark, Westport, Conn.; Gidion Elkeles, Glenview, Ill.

[73] Assignee: MML Computers, Inc., New York, N.Y.

[21] Appl. No.: 370,075

[22] Filed: Apr. 20, 1982

[51] Int. Cl.$^3$ .............................................. G03B 27/52
[52] U.S. Cl. ....................................... 355/40; 355/45; 355/64; 355/75
[58] Field of Search .......................... 355/40, 45, 64, 75

[56] References Cited

U.S. PATENT DOCUMENTS

| | | | |
|---|---|---|---|
| 3,669,539 | 6/1972 | Okuyama | 355/64 |
| 3,981,582 | 9/1976 | Bookless | 355/75 |
| 4,087,175 | 5/1978 | Johnson | 355/64 X |
| 4,198,157 | 4/1980 | Johnson | 355/40 |
| 4,283,621 | 8/1981 | Pembroke | 355/64 X |
| 4,286,864 | 9/1981 | Lysle et al. | 355/45 X |

*Primary Examiner*—Richard A. Wintercorn
*Attorney, Agent, or Firm*—Posnack, Roberts, Cohen & Spiecens

[57] ABSTRACT

A data storage system is provided which includes a document station for supporting documents for reading by an operator. A microfilm camera is superposed above the document station in order to photograph documents thereon. A display is provided on the station and the camera is so positioned and has a field of such size that it is adapted to encompass the station and documents thereon as well as the display. A keyboard and computer terminal are included and are so arranged that the operator can read data from the station or documents thereon, and enter data by means of the keyboard into the computer terminal. The keyboard includes controls coupled to the computer terminal and to the camera for operating the camera to photograph simultaneously any document on the station and the display. The camera includes a film transport device for transporting film along a path which is parallel with the horizontal axis of the station. Lamps are provided for illuminating the station and the keyboard includes rows of keys parallel to the aforesaid path. The camera is mounted on an adaptor such that it is regularly held in the position providing the aforenoted path, but such that it may be mounted without the adaptor in such a manner as to define a path which is ninety degrees displaced relative to the aforesaid path. The station includes limits which are proximal and distal relative to the keyboard and an image mark is provided adjacent the proximal limit.

17 Claims, 7 Drawing Figures

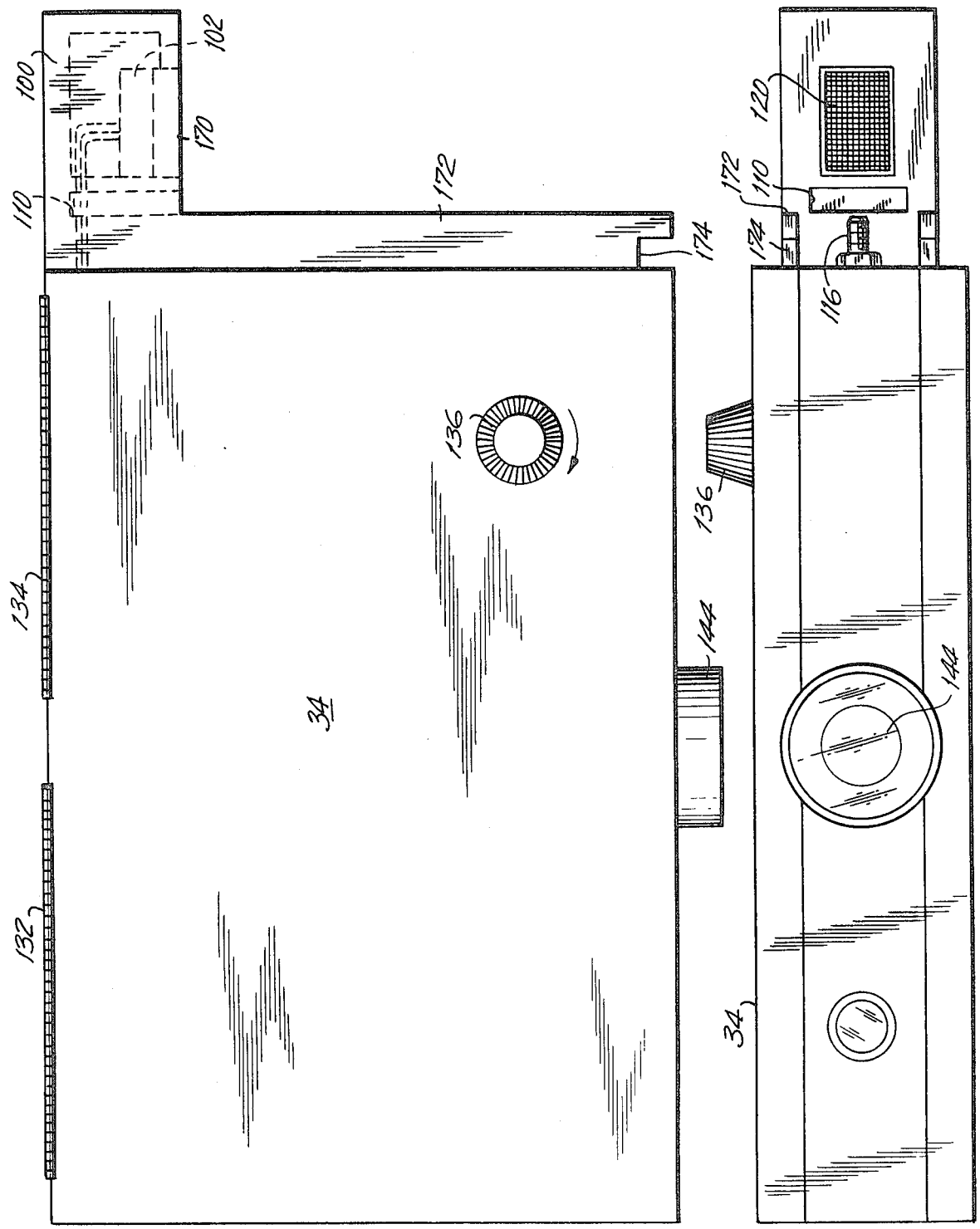

DATA STORAGE SYSTEM FOR STORING DOCUMENTS AND THE LIKE

FIELD OF INVENTION

This invention relates to data storage systems and more particularly data storage systems of the type which permit the microfilming of documents or the like and the insertion of data relevant to such documents into a data storage system.

BACKGROUND

As is stated in U.S. Pat. No. 4,087,175, which issued to Delmar R. Johnson, the processing of various types of business records and transactions involves the entry of information into a computer and the use of documents which may be concomitantly microfilmed. The combining of the data entry and the microfilm recording may be arranged such that the computer index, which results from the data entry, and the frame sequence on the film are synchronized and thus the computer index may be employed for effective data or document retrieval. If the procedures are technically combined, the need for a separate microfilming step is avoided and consequently there is a reduction in processing time and labor.

The Johnson Patent discloses an automatic microfilm camera positioned to record an image of a document while it is being read by an operator of a computer terminal. The computer generates a computer index number and optionally other relevant information, which may be forwarded via an interface circuit to a display adjacent a station at which the document to be photographed is supported. The camera takes a picture of the document and display under the control of the operator who pushes an appropriate button at the computer terminal or associated keyboard. Thus, both the document and the display are photocopied and the camera and computer are synchronized so as to maintain a mutual sequencing.

In the arrangement, the camera is provided with a film transport path which is fixed and thus susceptible of only one type of usage, as well as relatively limited focusing and this structural make-up of the device severely curtails the applications to which the apparatus may be applied. In this particular structural area, the Johnson Patent differs significantly from the structural features of the present invention. Moreover, the Johnson Patent reveals numerical displays and image marking techniques which are of significant disadvantage and which provide further areas in which the present invention provides substantial improvement.

It is recognized that cameras have long been supported by supporting structures which permit adjustment of the camera field and include focusing features. However, the adjustment of camera supports has not been known in association with automatically combined microfilming and data processing techniques with which the Johnson Patent and the instant invention are involved. Thus, for example, mounting adjustments are found in U.S. Pat. Nos. 2,318,871; 2,624,252; 2,985,415; 3,148,853; 3,183,770; and, 3,758,205. None of these patents, however, reveal a supporting structure which is remotely suggestive of the structure of the present invention, nor which achieves the results of the same.

SUMMARY OF INVENTION

It is an object of the invention to provide an improved data entry station.

It is yet another object of the invention to provide an improved data entry station involving simultaneously operable computer terminal apparatus and microfilming camera apparatus.

Another object of the invention is to provide for the improved support of a microfilming camera in a data entry station providing for adjustable film transport paths, as well as for the adjustment of focusing and camera field.

It is still another object of the invention to provide improved data displays and image marking indicia.

In achieving the above and other objects of the invention, there is provided a data support system comprising a station for supporting a document for reading by an operator, the document at this station having horizontal and vertical axes. A camera is superposed above the station to photograph any document thereon. Moreover, a computer terminal is provided for data processing. In accordance with the invention, a display is provided on the station adjacent any document to be photographed. The camera has a field of such a size that it is adapted to encompass the station and any document thereon, as well as the display. In addition, a keyboard is provided adjacent the station and is coupled to the computer terminal so that the operator can read data from the document at the station and enter this data into the computer terminal. The keyboard includes controls coupled to the computer terminal and hence to the camera for operating the camera to photograph simultaneously the document and the display. The camera, moreover, includes a film transport which is selectively adapted for being aligned to transport film along a path in parallel with the horizontal axis of the document at the aforesaid station. The film transport is, moreover, adapted to be supported in a position perpendicularly related to the horizontal axis.

The keyboard is provided with rows of keys which are arranged in parallel to the film transport path when the path is aligned in parallel with the aforesaid horizontal axis. Moreover, light banks are provided which straddle the station and are aligned parallel with the vertical axis. Still further, the display includes an array of positions aligned in parallel with the vertical axis. As will also be noted hereinafter, the above-mentioned station includes limits which are proximal and distal relative to the keyboard and an image mark arrangement is provided which is adjacent the proximal limit.

As will be shown in greater detail hereafter, a post is provided to support the camera above the station and an adaptor is provided to position the camera on the post with the path of the film transport parallel to the horizontal axis. The adaptor and post include electrical connections coupled in series to couple the camera to the keyboard. The adaptor is, as will be shown, selectively removable and the camera is mountable directly on the post with the electrical connection of the post coupling the camera to the keyboard. As will also be shown hereinbelow, the post includes a relatively stationary section and a slidable section vertically slidable on the stationary section to different levels of photographic magnification. The adaptor is mounted on the slidable section and the camera is selectively mountable on the adaptor or on the slidable section.

It will be shown hereinbelow that the electrical connection of the adaptor includes a cable with the adaptor and slidable section including plug and socket connections for the connection of the cable. Moreover, the cable and camera include further plug and socket connections for the connection of the cable to the camera.

With respect to the construction of the adaptor and associated parts, the slidable section and adaptor both define slots in which the adaptor and camera are respectively accommodated. These slots are perpendicularly related so that the camera, when positioned in the slot in the adaptor is positioned at 90° from the position at which it is located when positioned in the slot in the slidable section.

According to a specific feature of the invention, the camera includes an extension and the adaptor includes a tongue positioned in the slot thereof. The extension defines an opening by which the tongue is engaged. Moveover, the camera includes a focusing-adjusting pin located in the adaptor slot and the adaptor is provided with an access opening for access to this pin.

According to other specific features of the invention, the adaptor includes a wall supporting the aforesaid tongue and provided with a slot through which the pin extends, whereby the pin, and thereby the camera, are displaceable to enable the above-mentioned opening to engage the tongue. It will also be shown hereinbelow that the adaptor includes an L-shaped portion including two connected legs with a protrusion being provided on one of the legs for engaging in the slot in the slidable section, there being also provided spaced walls on the other of the legs to define the adaptor slot.

Other specific features of the invention find a flange being coupled to the above-mentioned tongue, the flange supporting the plug and socket relating to the camera and cable. As will be also shown, it is preferred in accordance with the invention, that the film travels along the above-mentioned path of the film transport from right to left.

Other objects, features and advantages of the invention will be found in the following detailed description as illustrated in the accompanying drawing.

BRIEF DESCRIPTION OF DRAWING

Figure 1:
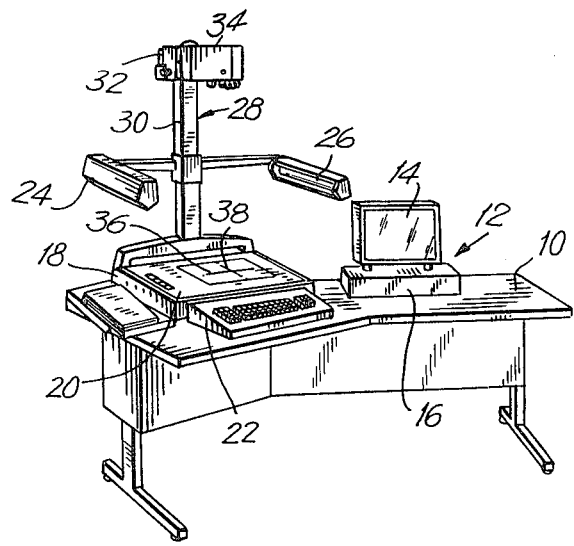
Figure 2:
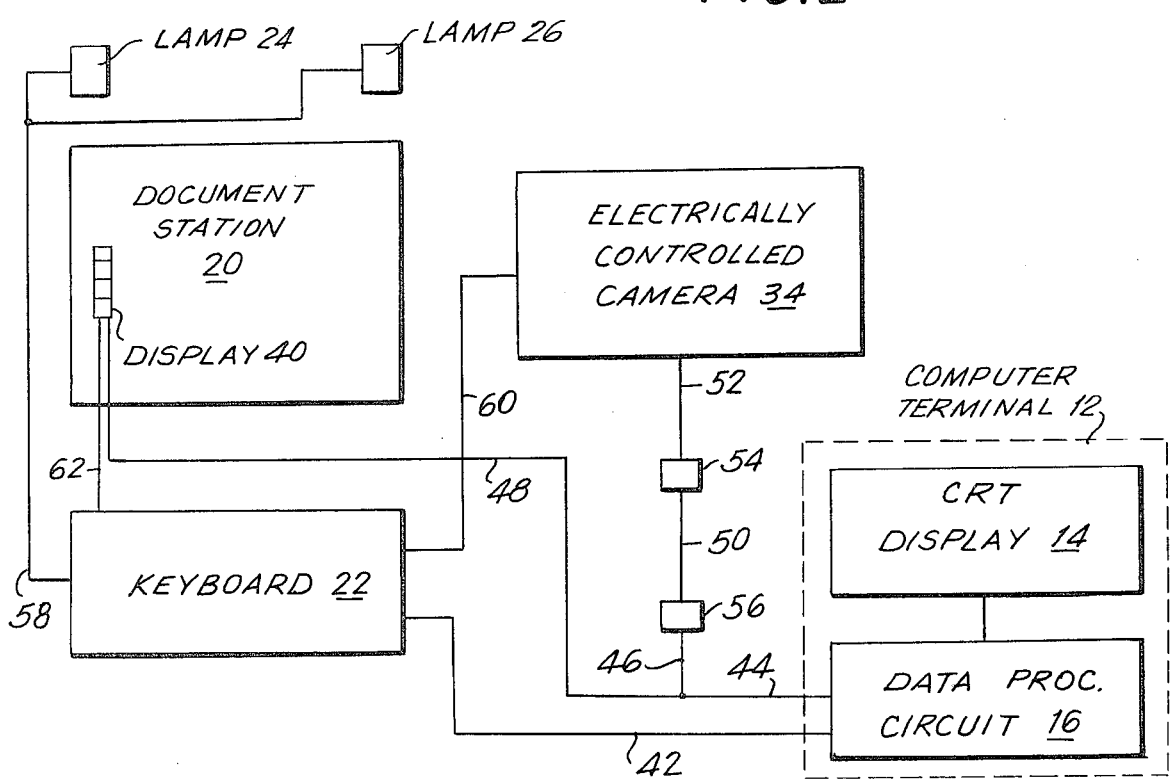
Figure 4:
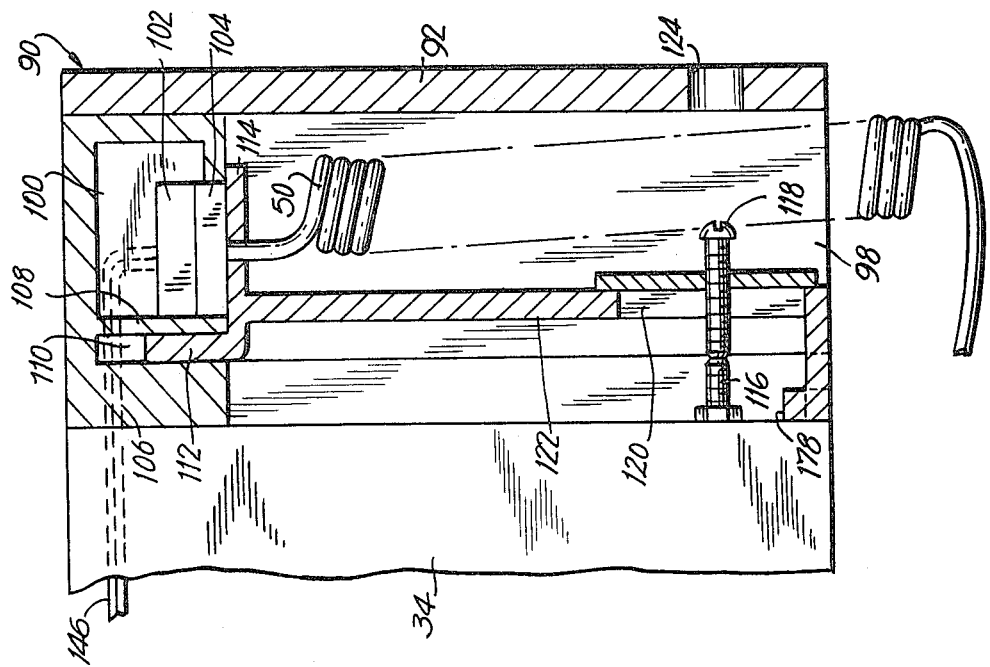
Figure 3:
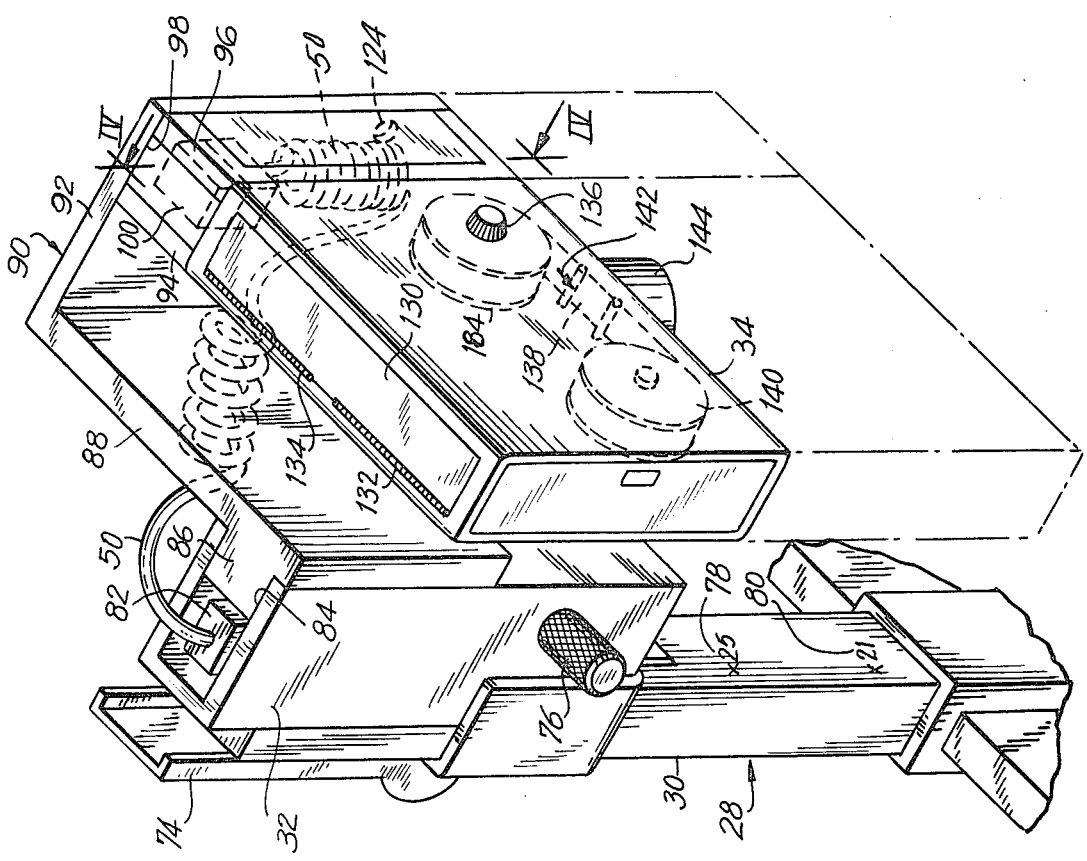
Figure 5:
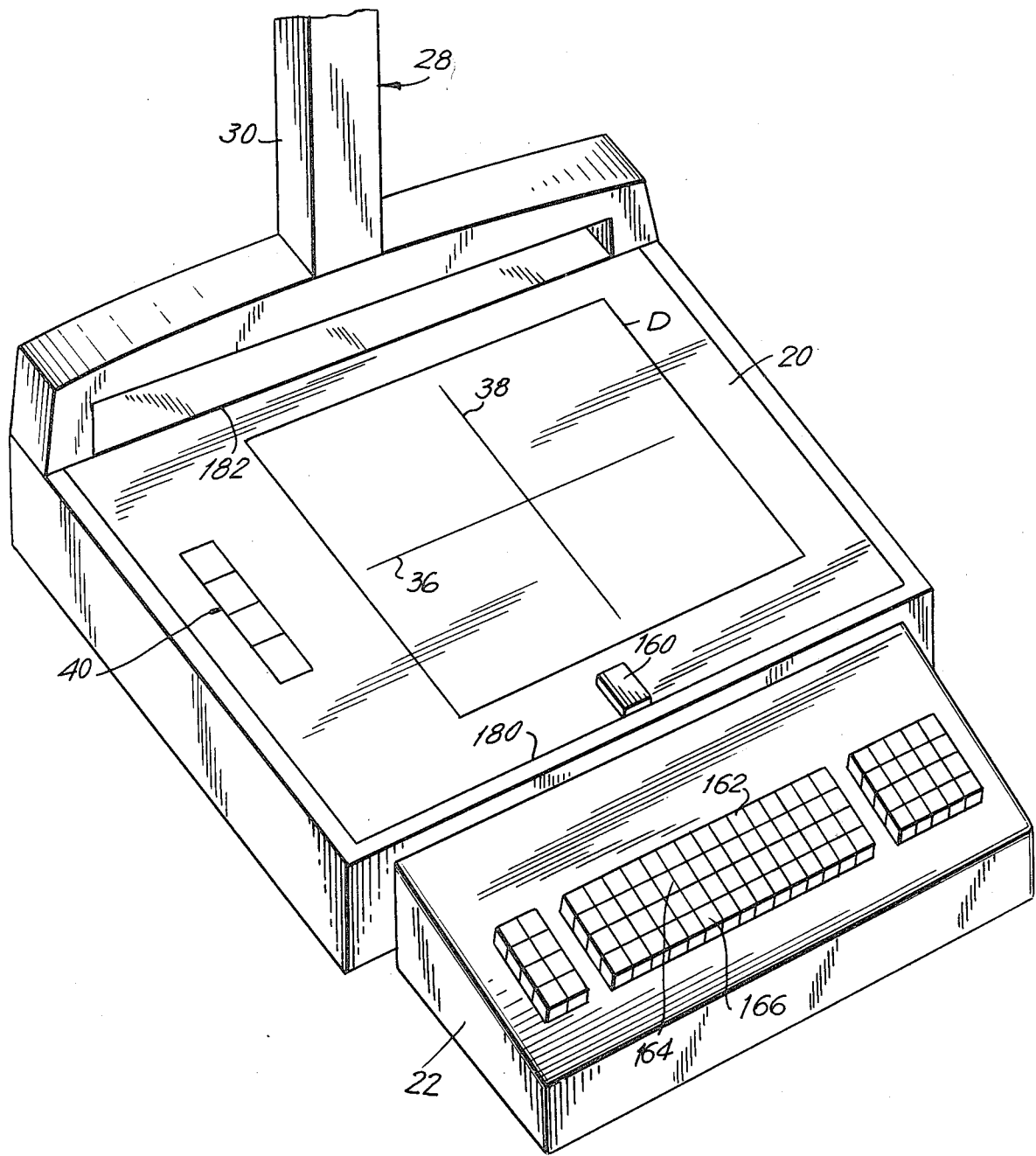

IN THE DRAWING:

FIG. 1 is a perspective view of a data entry system provided in accordance with the invention;

FIG. 2 is a block diagram illustrating data flow and control circuitry provided in the apparatus of FIG. 1;

FIG. 3 is a perspective view on enlarged scale of the adaptor and camera arrangement of the apparatus of FIG. 1;

FIG. 4 is a fragmentary section of view taken along line IV—IV of FIG. 3;

FIG. 5 is a perspective view of the document station and keyboard of the apparatus of FIG. 1;

FIG. 6 is a side view of the camera of FIG. 1; and

FIG. 7 is an end view of the camera of FIG. 6.

DETAILED DESCRIPTION

The data storage and retrieval system of the invention is required to do much more than solve an initial records management problem. The system must lend itself to increased office productivity and must harmonize with other office technologies in order to be an effective system in modern ambience. The system of the invention satisfies the needs for multiple use and information retrieval and for information storage. It puts together elements of microimaging, data entry, computerized indexing, CRT imaging, word processing, line printing and the automatic retrieval of stored microimage data and interfaces them into a single self-sufficient system. Because of the system's simplicity and ease of operation, electronic data processing is not needed for the system's implementation. The system permits keeping document data in inexpensive, easy to use microfilm magazines or cartridges while the system's computer terminal maintains an index of the location of each microfilmed image inclusive of any updates.

The system of the invention has a growth potential as additional departmental uses increase in number. The system's software is extremely flexible to adjust to more complicated and additional applications. Furthermore, the system of the invention can be called upon to communicate with other office equipment and is intra-office compatible. The system is furthermore designed to operate in normal business environment where clerical customer service and secretarial functions are to be performed. Individual work stations are available in self-sufficient desk top configurations to accommodate existing office environment or as a single functional work station which may be designed in an attractively styled configuration.

In accordance with the invention, a source document is placed upon a camera bed or station. An operator scans the document for pertinent data and keys that data by the system's easy to use screen manual and prompters, thereby enabling even an untrained operator to form data entry and verification. The document and its unique roll and frame identification numbers are simultaneously captured on film and inputted to a computer disk or the like. The entered data is then on line for any authorized user to retrieve. Roll and frame location can be also be filmed and entered automatically to substantially increase data entry speed.

Back up documents, such as work papers, calculator tapes, notes, contracts and drawings can be filmed behind their lead document to create a cohesive image package of an entire file or transaction. Only the document that contains required data need be entered. Entering data and simultaneously microfilming a document ensures a high degree of filming quality and data entry accuracy. In FIG. 1 is illustrated a data entry station including a desk top 10, a computer terminal 12 including a CRT display 14 and optionally incorporating computer circuitry in a casing 16 or in a casing 18 which, moreover, supplies a document station 20. A keyboard appears at 22 and the document station 20 is illuminated, not only by ambient light, but also by lamp banks 24 and 26. A vertical post 28 having a stationary section 30 and a slidable section 32 superposes, above the station 20, a microfilming camera 34, the field of which is adequate not only to film a document supported at the station 20, but also, as will be shown hereinafter, identifying information relative to the document supported at station 20, as well as the addresses thereof. A document supported on the station 20 will have, for purposes of reference, a horizontal axis 36 and a vertical axis 38. These axes are imaginary only and are reference lines for the alignment of other apparatus, as will be explained in greater detail hereinbelow.

As illustrated in FIG. 2, the document station 20 is provided with a display 40 related to the addresses and other information referred to hereinabove. Moreover, the display 40, keyboard 22, data processing circuit 16, CRT display 14 and electrically controlled camera 34 are interconnected by cables or electrical connections to enable the passage of information therebetween. Thus, for example, the keyboard 22 is coupled via a line or cable 42 to data processing circuit 16 which in turn is connected via line 44 to lines 46 and 48 to direct signals toward the camera 34 and the display 40. With respect to the camera 34, a number of lines or cables are connected in series including the line 46, as well as electrical connection cables 50 and 52. Connection 52 is directly connected to the camera 34 whereas line 46 is incorporated into the post 28 of FIG. 1 and line or cable 50 is positioned in an adaptor by means of which the camera 34 is mounted, as will be explained in greater detail hereinbelow. Connections 54 and 56 are plug and jack connections as will also become more apparent in the description which follows. FIG. 2 furthermore illustrates that the keyboard 22 may be connected via a line 58 to lamps 24 and 26. Thus, the lamps may be conveniently lighted by means of a control switch mounted on the keyboard 22, although such control switch may be readily provided in other physical locations, as will be readily obvious to those skilled in the art involved.

While the keyboard 22 is shown as being connected via the data processing circuit 16 to the display 40 and to the camera 34, such connection may alternatively be provided by a line 60 and a line 62 which will be effective for passing control signals directly to camera 34 and display 40. These lines 60 and 62 may be provided in substitution for lines 42, 44 and 48, or as alternatively available options to these lines.

One of the features of the invention is to provide for a selective mounting of the camera 34 with the film transport path therein aligned preferably with the horizontal axis 36 of FIG. 1, but optionally with this film path aligned with the vertical axis 38 of the document being photographed. An adaptor structure provided in accordance with a preferred embodiment to enable the camera to be mounted selectively by the adaptor, or directly on the post 28, appears in FIG. 3. Therein it will appear that the post 28 includes a relatively stationary section 30 and a relatively slidable head section 32 which telescopically nests in a telescopic portion 74 on the stationary section 30. The slidable section 32 has a pair of control handles of which is visible the handle 76 by means of which the slidable section 32 is released for travel vertically on the stationary section 30 to various positions establishing different levels of photographic magnification. Such levels are indicated at 78 and 80 indicating magnifications of 25 and 21 respectively. Other levels of magnification are available at higher elevations.

The slidable section 32 is provided with a socket in which is accommodated a jack 82 of cable 50 referred to hereinabove. The slidable section 32 is moreover provided with a slot 84 within which is accommodated protrusion 86 mounted on leg 88 of an L-shaped adaptor structure 90. The other leg 92 of adaptor 90 is provided with a double wall extension including walls 94 and 96 cooperatively defining a slot 98 at a perpendicular attitude relative to the slot 84. Slot 98 accommodates extension 100 on camera 34 to support the camera with its film transport path appropriately aligned, as has been indicated above, and as will be discussed in greater detail hereinbelow.

FIG. 4 illustrates some further details of the connection between the camera 34 and the adaptor 90. More specifically, in this Figure is shown the extension 100 on the camera. This extension serves to locate the camera and to support the socket 102 to which is connected the plug 104 connected at the end of the cable 50, which is located within the slot 98 in the relevant end portion of the adaptor 90.

In addition to the aforementioned structure, the extension 100 attached to the camera includes walls 106 and 108 defining an opening 110 which engages onto a tongue 112 which is supported on the adaptor. This enables an engagement between the camera structure and the adaptor structure which functions additionally with the extension 100 located in slot 98 to firmly position the camera 34 on the adaptor.

Attached to the tongue 112 is a flange 114, the flange having an opening through which passes the cable 50 at the end thereof attached to the plug 104. It will also be noted that the camera 34 is provided with a focusing adjusting pin 116 having a slotted head 118. Rotation of the pin 116 functions to adjust the fine focusing of the camera relative to the document being photographed. The pin 116 is accommodated in a vertically extended slot 120 in flange 122, the purpose of such slot being to permit a vertical displacement of the pin 116 so that the extension 100 on camera 34 may be inserted into the slot 98 with facility.

The rear wall or leg 92 of the adaptor is provided with an access opening 124. This access opening permits access to the head 118 of the pin 116 thereby permitting adjustment of the focus of the camera 34.

As appears in FIG. 3, the camera 34 has a door 130 hinged, for example, to the main body of the camera by hinges 132 and 134. This door permits access to the interior of the camera and thus provides for installation and removal of the film which is utilized by the camera for purposes of microfilming documents located at the aforementioned document station. In FIG. 3 is furthermore indicated the source roll 184 mounted on spocket 136 for purposes of supplying film 138 which is taken up by cartridge 140, the film travelling along a path indicated by arrow 142, which in the illustrated selective position of the camera 34 is parallel to the horizontal axis 36 illustrated in FIG. 1.

The lens of the camera is indicated at 144 and electrical connections to the working elements of the camera are illustrated in FIG. 4 at 146. The signals carried along the wire 146 will serve to step the film from frame to frame and may moreover operate to convey signals to the display 40 at the station for documents in order to indicate the exhausting of the available film in the camera. Moreover, the signals along the wire 146 may function to sever exposed portions of the film 138 in order to enable these exposed portions to be developed before the supply or source roll of film has been completely used up.

FIG. 5 illustrates the station 20 of the system of the invention with an illustrative display 40 mounted adjacent the same. This display 40 may include an array of display positions which array is aligned in parallel with the vertical axis 38. FIG. 5 moreover illustrates the identification index 160 which is photographed along with document D on station 20 and along with the display 40. The display 40 may contain addresses, both with respect to frames, cartridges and pages. Display 40 may as well display information relevant to data being entered into the computer terminal. The index 160 is a search index which enables frames to be counted when the developed film is being reviewed for the recapture of photographed documents and other related information.

In FIG. 5 it will be moreover noted that the keyboard is provided with rows of keys, these rows being indicated generally 162, 164 and 166. These rows, it will be noted, are positioned in parallel with the horizontal axis 36 to afford maximum convenience to an operator who is employing the keyboard 22.

FIGS. 6 and 7 illustrate some additional details relative to the camera 34 and the extension 100. Therein it will be seen that a socket or jack 102, as mentioned hereinabove, provides a connection at 170 to the corresponding end of the cable 50 mentioned hereinabove. Also seen in FIG. 6 is a longitudinal beam 172 provided with a slot 174 for engaging a protrusion 178 illustrated in FIG. 4 as constituting a part of the adaptor 90. Also seen in FIGS. 6 and 7 are the lens 144 and the hinges 132 and 134.

From what has been described above, it is seen that the data storage system of the invention comprises a station for supporting documents in sequence for reading by an operator with a camera being superposed above the station to photograph the documents as they sequentially are exposed thereon. A computer terminal is provided for data processing and a display is provided on the station adjacent the same. The camera has a field adapted to encompass the station and the display, whereby the supported and exposed document and the display may be photographed together along with the image marking index. It will also be noted that the keyboard is provided adjacent the station with the rows of keys thereon parallel to the horizontal axis of the document and document station. The keyboard is coupled to the computer terminal such that the operator can read data from the documents superposed on the station and can enter this data into the computer terminal. The keyboard includes a control such as ENTER, PAGE ADVANCE or EXECUTE buttons susceptible of permitting the operator to control the computer terminal or associated circuits to enter data or alter frame designations or addresses and the like. A cartridge (not shown), which can be selectively positioned in the computer terminal, may also generate signals to identify cartridge address and frame address, as well as giving page information and the like.

It will be noted that in the arrangement of the invention light banks straddle the station and are aligned in parallel with the vertical axis. It will furthermore be noted that the display mounted adjacent the station includes an array of positions aligned in parallel with the aforesaid vertical axis 38.

The station mentioned hereinabove includes limits such as indicated generally at 180 and 182, these limits being generally parallel to the horizontal axis 36. The limit 180 is the limit which is proximal relative to the keyboard 22 whereas the limit 182 is a limit which is distal relative to the keyboard 22. It will be noted that the index 160 is, in accordance with the provisions of the invention, mounted adjacent the proximal limit to obtain the advantages which inure to the benefit of the invention by reason thereof. It should also be noted that the film 138 in the camera (see FIG. 3) travels along a path 142 which is not only preferably parallel to the horizontal axis 36, but moreover traverses the station and the camera in a direction from right to left.

There will now be obvious to those skilled in the art many modifications and variations of the structure and arrangement set forth hereinabove. These modifications and variations will not depart from the scope of the invention, if defined by the following claims.

What is claimed is:

1. A data storage system comprising station means for supporting a document at a document station for reading by an operator, said document having at said station horizontal and vertical axes, camera means superposed above said station means to photograph the document thereon, computer means for data processing, display means on said station means adjacent said station, said camera means having a field adapted to encompass said station and said display means, a keyboard means adjacent said station and coupled to said computer means so that said operator can read data from said document and enter said data into the computer means, said keyboard means including control means coupled to said computer means and to said camera means for operating the camera means to photograph simultaneously said document and said display means, said camera means including film transport means selectively adapted for being aligned to transport film along a path in parallel with said horizontal axis, post means to support said camera means above said station means, and adaptor means to position said camera means on said post means with said path parallel to said horizontal axis, said adaptor means and post means including electrical connection means coupled in series to couple said camera means to said keyboard means.

2. A data storage system as claimed in claim 1, wherein said keyboard includes rows of keys parallel to said path.

3. A data storage system as claimed in claim 1 comprising light bank means straddling said station and aligned parallel with said vertical axis.

4. A data storage system as claimed in claim 1, wherein said display means is coupled to said computer means and includes an array of positions aligned in parallel with said vertical axis.

5. A data storage system as claimed in claim 1, wherein said station includes limits which are proximal and distal relative to said keyboard means, comprising image mark means adjacent said proximal limit.

6. A data storage system as claimed in claim 1, wherein said adaptor means is selectively removable and the camera means is mountable directly on said post means with the electrical connection means of the post means coupling the camera means to the keyboard means.

7. A data storage system as claimed in claim 6, wherein said post means includes relatively stationary means and slidable means vertically slidable on said stationary means to different levels of photographic magnification, said adaptor means being mounted on said slidable means, said camera means being selectively mountable on said adaptor means or on said slidable means.

8. A data storage system as claimed in claim 7, wherein the electrical connection means of the adaptor means includes a cable, said adaptor means and slidable means including plug and socket means for the connection of said cable, said cable and camera means including further plug and socket means for the connection of said cable to said camera means.

9. A data storage system as claimed in claim 8, wherein said slidable means and adaptor means both define slots in which said adaptor means and camera means are respectively accommodated.

10. A data storage system as claimed in claim 9, wherein said slots are perpendicularly related so that the camera means, when positioned in the slot in the adaptor means, is positioned at ninety degrees from the position at which it is located when positioned in the slot in the slidable means.

11. A data storage system as claimed in claim 10, wherein said camera means includes a camera and an extension on said camera, said adaptor means including a tongue in the slot thereof, said extension defining an opening by which said tongue is engaged.

12. A data storage system as claimed in claim 11, wherein said camera includes a focus adjusting pin located in the slot in the adaptor means, said adaptor means being provided with an access opening for access to said pin.

13. A data storage system as claimed in claim 12, wherein said adaptor means includes a wall supporting said tongue and provided with a slot through which said pin extends, whereby the pin and thereby the camera are displaceable in the slot of said adaptor means to enable said opening to engage said tongue.

14. A data storage system as claimed in claim 13, wherein said adaptor means includes an L-shaped portion including two connected legs, a protrusion on one of said legs for engaging in the slot in said slidable means, and spaced walls on the other of the legs to define the slot of the adaptor means.

15. A data storage system as claimed in claim 14 comprising a flange on said tongue, said flange supporting said further plug and socket means.

16. A data storage system as claimed in claim 1, wherein said transport means is such that the film travels along said path from right to left.

17. A data storage system as claimed in claim 14 comprising a flange on said tongue, said flange supporting said further plug and socket means.

* * * * *